Sept. 30, 1969               R. WICK               3,469,912
APPARATUS FOR OPTICALLY ALIGNING LATERALLY OFFSET NEGATIVE
FRAMES WITH PHOTOSENSITIVE MATERIAL
Filed Jan. 31, 1967
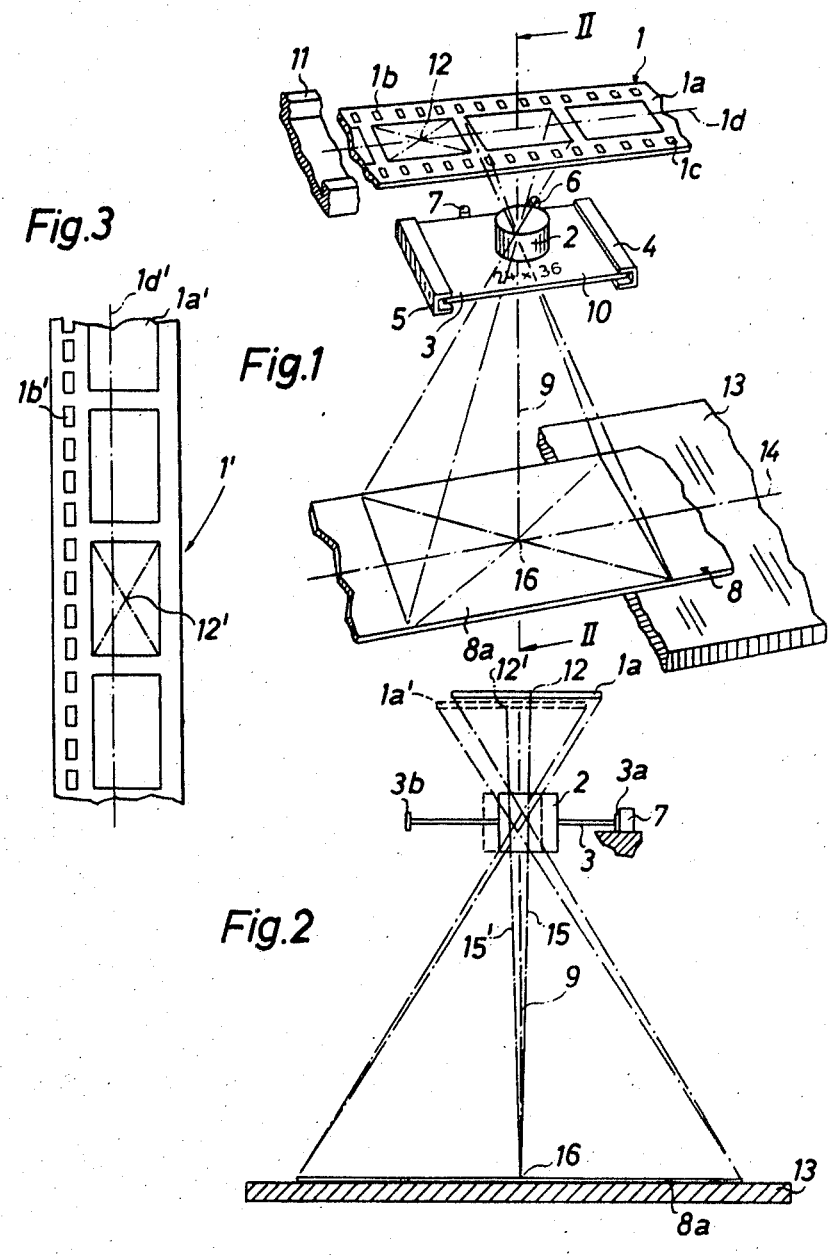
INVENTOR.
RICHARD WICK

United States Patent Office 3,469,912
Patented Sept. 30, 1969

3,469,912
APPARATUS FOR OPTICALLY ALIGNING LATER-
ALLY OFFSET NEGATIVE FRAMES WITH
PHOTOSENSITIVE MATERIAL
Richard Wick, Grunwald, Germany, assignor to Agfa-
Gevaert Aktiengesellschaft, Leverkusen, Germany
Filed Jan. 31, 1967, Ser. No. 612,876
Claims priority, application Germany, Feb. 4, 1966,
A 51,506
Int. Cl. G03b 27/00, 27/52
U.S. Cl. 355—18
10 Claims

ABSTRACT OF THE DISCLOSURE

Enlarger for plural types of roll film negatives wherein the lens is movable to several positions to form images of negative frames, held in a fixed carrier, onto sheets of photosensitive material. The optical axis of the lens coincides, at least substantially, with the line connecting the central points of successive frames with central points of successive increments of enlarging paper onto which the lens focusses the images of the respective frames.

Background of the invention

The present invention relates to enlargers, and more particularly to enlargers of the type which can project images of frames on roll film negatives onto sheets or webs of enlarging paper and analogous photosensitive material.

Conventional enlargers are normally utilized for processing of roll film negatives wherein the frames are located midway between two rows of marginal perforations. However, many recent types of roll film are provided with a single row of perforations which are adjacent to one edge of the negative. The frames are adjacent to the other edge and their central points (where the diagonal lines intersect) are not located in the central longitudinal symmetry plane of the film. Therefore, such recent types of roll film must be processed in specially constructed enlargers.

Accordingly, it is an important object of the present invention to provide an enlarger which can be used with plural types of negatives, particularly with roll films having one or two rows of marginal perforations.

Another object of the invention is to provide an enlarger which can be rapidly and conveniently converted for processing of plural types of negatives.

A further object of the invention is to provide an enlarger of the above outlined character wherein a single lens suffices to project images of frames on plural types of negatives.

An additional object of the invention is to provide an enlarger which can utilize nearly all component parts of conventional enlargers but is capable of processing several types of roll film negatives.

Summary of the invention

The invention resides in the provision of an apparatus which can be utilized for focussing images of frames on plural types of negatives, whose width is the same but wherein the frames of one negative type are offset laterally with reference to the frames of another negative type, onto enlarging paper or analogous photosensitive sheet or web material. The apparatus comprises fixed first carrier means arranged to accommodate plural types of negatives (for example, roll films with one or two rows of perforations), second carrier means for supporting the sheet material at a preselected distance from the first carrier means and in such position that the central longitudinal symmetry plane of the image-receiving portion of the sheet coincides with the central longitudinal symmetry plane of that negative which is accommodated in the first carrier means, a lens support located intermediate the two carrier means, and lens means mounted on the support and being adjustable between a plurality of positions in each of which the optical axis of the lens means coincides (substantially or exactly) with a line connecting the central point of a different negative frame in the first carrier means with the central point of the image receiving portion of the sheet on the second carrier means.

The novel features which are considered as characteristic of the invention are set forth in particular in the appended claims. The improved enlarger itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a fragmentary perspective view of an enlarger which embodies my invention and which is shown in the process of producing positives from successive frames of a roll film having two rows of perforations;

FIG. 2 is a transverse vertical section as seen in the direction of arrows from the line II—II of FIG. 1; and FIG. 3 is a fragmentary top plan view of a second type of roll film which can be processed in the enlarger of FIGS. 1 and 2.

Description of the preferred embodiments

FIG. 1 illustrates an enlarger which comprises a fixed carrier 11 for a negative 1 here shown as a length of 35 mm. roll film having a sequence of centrally located frames 1a and two rows of marginal perforations 1b, 1c. The central symmetry plane extending midway between the edges of the negative 1 is shown at 1d. The carrier 11 defines a passage or path for the negative 1, and the enlarger is provided with a conventional transporting mechanism which advances the negative lengthwise. The means for fixing the carrier 11 to the frame of the enlarger is not shown in the drawing.

The carrier 11 can also accommodate a different type of negative constituted by a roll film 1', shown in FIG. 3, whose frames 1a' are not located midway between the edges. This is due to the fact that the negative 1' comprises a single row of perforations 1b' adjacent to one edge. The central points of frames 1a, 1a' are respectively indicated at 12 and 12'. It will be noted that the central symmetry plane 1d' of the negative 1' also extends midway between the edges but does not include the central points 12'. Since the carrier 11 is fixedly mounted on the frame of the enlarger, the position of the symmetry plane 1d will be identical with that of the symmetry plane 1d'. However, the position of a central point 12 will not coincide with that of a central point 12'.

The frame of the enlarger further supports a second carrier or baseboard 13 which is movable up and down and serves to support a web or sheet 8 of photosensitive material whose emulsion-coated side faces the negative 1. The central symmetry plane 14 of the sheet 8 coincides with the symmetry plane 1d or 1d' and includes the main axis 9 of the enlarger. More particularly, the plane 14 is the central symmetry plane of that portion 8a of the sheet 8 onto which the image of a frame 1a or 1a' is projected by a lens 2. This lens is mounted on a plate-like lens support 3 and the latter is slidable in fixed U-shaped guide means or ways 4, 5 into abutment with fixed stop pins 6, 7 which serve to locate the support 3 in such position that the optical axis of the lens 2 coincides, at least substantially, with a line 15 or 15' connecting the central point 16 of the image-receiving portion 8a of the sheet 8 with the central point 12 or 12' of a frame 1a or 1a'. The mechanism for transporting the sheet 8 lengthwise is known and its details form no part of the present invention.

FIG. 2 illustrates the lens 2 in two positions which are respectively indicated by solid and broken lines and further shows two negative frames 1a and 1a'. The central points 12, 12' of the frames 1a, 1a' are located at the opposite sides of and are equidistant or nearly equidistant from the main axis 9. The arrangement is such that, when located in the solid-line position, the lens 2 will focus the image of the frame 1a on the portion 8a of the sheet 8. When moved to the broken-line position, the lens will focus the image of the frame 1a' on the same portion 8a of the sheet 8. The lens is mounted off center, i.e., it is nearer to one edge portion 3a than to the other edge portion 3b of the support 3 and must be removed, turned in the plane of the support through 180 degrees, and reinserted in order to assume the broken-line position of FIG. 2 in which the enlarger is ready to process the negative 1' of FIG. 3.

In order to improve the quality of positives, the lens 2 can be mounted on its support 3 in such a way that its optical axis coincides exactly with the line 15 or 15', i.e., that its optical axis is inclined with reference to the main axis 9. The angle of inclination of the optical axis with reference to the main axis 9 is rather small and its magnitude is a function of the distance between the central point 12 or 12' and the main axis.

It is further to be noted that the enlarger can be furnished with two lenses each of which is mounted on a separate support in such a way that one of the lenses assumes the solid-line position and the other lens assumes the broken-line position of FIG. 2 when the corresponding support abuts against the stop pins 6 and 7.

The operation of the enlarger is as follows:

If the operator wishes to obtain positives of images on the frames 1a of a negative 1, such negative is inserted into the carrier 11 and is moved stepwise to place successive frames 1a into requisite position with reference to the lens 2. The latter is inserted as shown in FIG. 2 by solid lines so that it focusses the images of successive frames 1a on successive portions 8a of the photosensitive sheet 8. The latter is moved stepwise in synchronism with the negative.

If the same lens 2 is suitable for projection of images from the frames 1a' on a negative 1' with a single row of perforations 1b', the support 3 is inserted in a different position to locate the lens in the broken-line position of FIG. 2. The apparatus is then ready to furnish positives of images of the frames 1a'.

The symbols 10 on the support 3 are applied for the purpose of convenient identification of lenses and to insure proper insertion of a dual-purpose lens. The likelihood of improper selection and/or improper insertion of lenses is very remote.

The improved enlarger may be obtained by simple and relatively inexpensive conversion of a conventional enlarger. All that is necessary is to fix the carrier 11 in requisite position and to install in the conventional enlarger suitable guide means 4, 5 for the supports 3 and their lenses 2. If a conventional enlarger does not embody a carrier which can accommodate two or more types of negatives having the same width, a carrier corresponding to the carrier 11 will be furnished with a set of supports 3.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. Apparatus for focussing images of frames on plural types of negatives, whose width is the same but wherein the frames of one negative type are offset laterally with reference to frames of another negative type, onto enlarging paper or analogous photosensitive material, comprising fixed first carrier means arranged to accommodate plural types of negatives; second carrier means for supporting photosensitive material at a preselected distance from the first carrier means and in such position that the central longitudinal symmetry plane of the thus supported photosensitive material coincides with the central longitudinal symmetry plane of that negative which is accommodated in said first carrier means; a lens support located intermediate said first and second carrier means; and lens means mounted on said support and adjustable between a plurality of positions in each of which the optical axis of said lens means coincides, at least substantially, with a line connecting the central point of a different negative frame in said first carrier means with the central point of that portion of the photosensitive material on which the image of the negative frame is focussed.

2. Apparatus as defined in claim 1 and having a main axis which is located in said symmetry planes.

3. Apparatus as defined in claim 2 for plural types of negatives in the form of roll films, said first carrier means defining a path for lengthwise movement of roll films, one type of said roll films having two rows of perforations and a sequence of frames between such perforations and another type of said roll films having a single row of perforations adjacent to one edge and a sequence of frames adjacent to the other edge thereof.

4. Apparatus as defined in claim 2, wherein the central points of frames on two of said negative types are located at the opposite sides of said main axis.

5. Apparatus as defined in claim 4, wherein the central points of frames on said two types of negatives are located at substantially the same distance from the main axis.

6. Apparatus as defined in claim 4, wherein said lens means is movable between two positions in each of which said optical axis coincides substantially with the line connecting the central point of a frame on one of said two types of negatives with the central point of that portion of photosensitive material onto which the image of the respective frame is projected.

7. Apparatus as defined in claim 6, wherein said lens means is arranged to return with said support through 180 degrees in order to change said positions thereof.

8. Apparatus as defined in claim 6, wherein the optical axis of said lens means is inclined with reference to said main axis to coincide exactly with said connecting line.

9. Apparatus as defined in claim 2, wherein the optical axis of said lens means is inclined with reference to said main axis to coincide exactly with said connecting line.

10. Apparatus as defined in claim 1, further comprising fixed guide means slidably accommodating said support and stop means for locating said support in a position in which the optical axis of said lens means coincides, at least substantially, with said connecting line.

References Cited

UNITED STATES PATENTS 3,299,777  1/1967  Hunstiger _____ 88—24
3,316,802  5/1967  Shuert _____ 88—24

NORTON ANSHER, Primary Examiner

R. A. WINTERCORN, Assistant Examiner

U.S. Cl. X.R.

355—55